United States Patent
Cambon et al.

(10) Patent No.: US 12,232,486 B2
(45) Date of Patent: Feb. 25, 2025

(54) CASE, COLUMN, AND METHOD FOR BREEDING BIVALVES

(71) Applicant: EARL CAMBON & FILS, Meze (FR)

(72) Inventors: Philippe Cambon, Meze (FR);
Christophe Cambon, Loupian (FR)

(73) Assignee: EARL CAMBON &FILS, Meze (FR)

( * ) Notice: Subject to any disclaimer, the term of this patent is extended or adjusted under 35 U.S.C. 154(b) by 420 days.

(21) Appl. No.: 17/624,331

(22) PCT Filed: Jul. 1, 2020

(86) PCT No.: PCT/EP2020/068535
§ 371 (c)(1),
(2) Date: Dec. 31, 2021

(87) PCT Pub. No.: WO2021/001430
PCT Pub. Date: Jan. 7, 2021

(65) Prior Publication Data
US 2022/0272950 A1    Sep. 1, 2022

(30) Foreign Application Priority Data
Jul. 1, 2019  (FR) ........................................ 1907292

(51) Int. Cl.
*A01K 61/55*    (2017.01)
(52) U.S. Cl.
CPC ................................... *A01K 61/55* (2017.01)
(58) Field of Classification Search
CPC ..................................................... A01K 61/55
See application file for complete search history.

(56) References Cited

U.S. PATENT DOCUMENTS

| | | | | |
|---|---|---|---|---|
| 3,702,599 A | * | 11/1972 | Herolzer ................ | A01K 61/54 |
| | | | | 119/241 |
| 3,741,159 A | | 6/1973 | Halaunbrenner | |
| 3,870,019 A | * | 3/1975 | McNicol ................ | A01K 61/54 |
| | | | | 119/241 |

(Continued)

FOREIGN PATENT DOCUMENTS

| | | |
|---|---|---|
| FR | 2112566 A5 | 6/1972 |
| FR | 2893229 A1 | 5/2007 |

(Continued)

*Primary Examiner* — Monica L Perry
*Assistant Examiner* — Brittany A Lowery
(74) *Attorney, Agent, or Firm* — Craft Chu PLLC; Andrew W. Chu

(57) ABSTRACT

The breeding case for bivalves includes a submersible body having at least one housing receiving and protecting at least one bivalve and a framework. The framework is formed by two branches which extend respectively along two mutually perpendicular axes, the branches defining a determined number of housings. Each housing is equipped with a bottom and a protective wall which extends from the bottom to an upper edge at the upper portion of the submersible body. The case also includes at least one movement slide and locking mechanism for a locked position with the movement slide. The invention also concerns a bivalve breeding column having a determined number of breeding cases fitted one on top of the other. The method for bivalve breeding in connection with the bivalve breeding column is also part of the invention.

12 Claims, 5 Drawing Sheets

(56) References Cited

U.S. PATENT DOCUMENTS

| | | | | |
|---|---|---|---|---|
| 5,515,813 A | * | 5/1996 | Wilkerson | A01K 61/54 119/237 |
| 2011/0067641 A1 | * | 3/2011 | Kithil | A01K 61/00 417/330 |
| 2013/0180461 A1 | | 7/2013 | Fujiyoshi | |

FOREIGN PATENT DOCUMENTS

| | | |
|---|---|---|
| FR | 3032860 A1 | 8/2016 |
| FR | 3062026 A1 | 7/2018 |

\* cited by examiner

CASE, COLUMN, AND METHOD FOR BREEDING BIVALVES

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention falls within the field of shellfish farming, and more particularly in the field of bivalve farming, such as oysters, clams, scallops, mussels, etc. 2. Description of Related Art Including Information Disclosed Under 37 CFR 1.97 and 37 CFR 1.98.

Current techniques for breeding bivalves suspended under tables, and more specifically suspended oysters, include several steps that involve significant handling and therefore high labor costs.

There are three main techniques for breeding bivalves in the maritime domain in non-tidal waters or at low tide.

In a first technique, the bivalves in the spat state are fixed directly on a rope using cement. The ropes bearing bivalves are then suspended under a table for a period varying from 6 to 18 months, which corresponds to a development stage of the spat. When the bivalves reach their adult size, the ropes are removed from the water and a detaching step is carried out. The detaching step consists in separating the bivalves from the rope and from each other. During this breeding process, the spat fixing and detaching steps require the employment of significant and costly labor.

In addition, even in the presence of nets, predators decimate bivalve colonies. Predation combined with parasitic and/or microbiotic phenomena lead to low production yields, which are very often less than 50%.

It should be noted that before being fixed to the rope, the spat may optionally undergo a pre-grow-out stage in a lantern for a period of 6 months. The pre-grow-out stage means that the shellfish farmer once again calls on a large workforce. Then, the pre-grown bivalves are fixed on a rope using cement.

In addition, the cement used to fix the bivalves is another problem. Generally, the cement is in the water and pollutes the lagoons or bodies of water hosting shellfish farms.

Two other techniques offer an alternative in order to protect the spat from predation.

These are lantern breeding techniques that allow the bivalve of a T15 spat to be bred until a bivalve of adult size is obtained. However, these techniques require regular exposure to remove algae that accumulates inside the lanterns. In addition, for a shellfish farm to be profitable, it must agree to make substantial investments through the acquisition of a large number of lanterns.

In general, current techniques display low production yields and high operating costs due to the use of a large labor force and/or to substantial investments in equipment.

To address these problems, in document FR 3 032 860 the applicant has described a technique for breeding bivalves in a dynamic case.

This technique uses a bivalve breeding case comprising a submersible body so as to be submerged in water. The submersible body is designed to be fixed on a rope so that it is suspended under a breeding table.

The submersible body of the case has a housing for receiving and protecting at least one bivalve. According to this technique, the bivalve is inserted into a reception and protection housing when it is in the spat state, the reception and protection housing comprising a petal movable between a retracted position and a deployed position. In the retracted position, the petal protects the spat from predators by covering it. In the deployed position, the petal allows an adult-sized bivalve to filter plankton easily. It should be noted that the petal is expected to deploy under the growth spurt of the bivalve.

When a set of cases is fixed to a suspended rope, this technique retains the advantages of vertical rope suspension breeding. Indeed, a set of breeding cases fixed on a rope occupies the entire height of the water column and therefore optimizes the filtration space of each bivalve. However, fixing each case to the rope also requires a significant amount of labor. Furthermore, the industrial production of this case proves to be expensive, in particular due to the design of flexible petals capable of being deployed under the pressure of the bivalve's growth.

Other technical breeding documents described by documents U.S. Pat. No. 5,515,813 and FR 2 893 229 propose compartmentalized bivalve support trays that form a breeding column. The support trays are secured through a cannula disposed in the center of the tray that comprises a decreasing section so as to be nested above and below with another support tray. The cannula is configured so that a suspension rope can extend through it to suspend the breeding column from a table. These two documents describe techniques that have the advantage of using the principle of vertical breeding suspended on a rope. However, they are not practical to implement; in particular, they require the use of a tubular net over the entire height of the column in order to protect the bivalves. In addition, once the column is loaded with spat, transport to the breeding table is complicated, since a breeding column can be between 3 and 5 meters high.

BRIEF SUMMARY OF THE INVENTION

In order to alleviate the problems identified in the state of the art, the applicant hereby proposes a technical solution that aims to improve the techniques for breeding bivalves.

To this end, a first aspect of the invention relates to a breeding case for bivalves comprising a submersible body that comprises at least one orifice through which a rope can be threaded, the breeding case comprising at least one housing provided in the submersible body and capable of receiving and protecting at least one bivalve, the submersible body having a framework that extends from an upper rim defining the upper portion of the submersible body and toward a lower end of at least one side wall, the lower end of the side wall defining the lower portion of the submersible body, the framework is formed by two branches that extend respectively along two mutually perpendicular axes B-B and C-C, the two branches intersect at a point corresponding to an orifice through which a suspension axis A-A passes that is perpendicular to the plane formed by the two radial axes B-B, C-C of the branches, the branches delimiting a determined number of housings, each housing is equipped, on the one hand, with a bottom defining the lower portion of the submersible body, and on the other hand, with a protective wall that extends from the bottom of the housing to an upper edge disposed at the upper portion of the submersible body.

In this sense, the breeding case has the advantage of being a culture medium that protects the bivalves from predators and reduces the risks of germ transmission. All this makes it possible to optimize the production yield of bivalves.

Advantageously, the breeding case is characterized in that it comprises at least one movement slide and locking means sliding in translation that communicate in the locked position with the movement slide, the locking means allowing two breeding cases to be nested by superposition, while the movement slide contributes, on the one hand, to making two nested breeding cases movable in translation along the suspension axis A-A and, on the other hand, to allowing a tilting movement of the upper breeding case relative to the lower breeding case.

In particular, the locking means allow two breeding cases to be assembled by superposition below and/or above. This feature makes it possible to form bivalve breeding columns made up of a determined number of breeding cases.

In addition, the locking means also cooperate with at least one movement slide, the locking means of the upper case sliding in the movement slide of the lower case or, conversely, the locking means of the lower case sliding in the movement slide of the upper case.

Moreover, the movement slide also allows the upper breeding case to tilt relative to the lower breeding case, when two breeding cases are nested by superposition. In order to amplify the tilting phenomenon, but also to prevent the two cases from unlocking, the movement slide may comprise a toggle stop disposed at the upper rim.

More precisely, according to a first feature of the first aspect of the invention, the locking means have:
- at least one female member disposed in the upper portion of the submersible body, the at least one female member comprising at least one opening located in a plane passing through the radial axis B-B, the opening communicating with a locking slide parallel to the radial axis B-B,
- at least one male member disposed in the lower portion of the submersible body, the at least one male member comprising an offset segment of the submersible body and a stop disposed at the free end of the offset segment, and
- the at least one male member being configured to complement the at least one female member.

More specifically, it is the male member which is configured to slide in the female member and reach the locked position. Likewise, in the locked position, the male member is configured to slide within the movement slide. For two cases that are nested by superposition, this configuration provides mobility with respect to one another.

A second variant of the first feature consists in reversing the position of the male member and the female member. According to this variant, the female member is disposed in the lower portion while the male member is positioned in the upper portion of the submersible body.

According to a second feature of the first aspect of the invention, the breeding case comprises four bivalve housings respectively disposed radially with respect to the suspension axis A-A and between two branches of the framework.

According to a third feature of the first aspect of the invention, each branch has a cross-section comprising two side walls that are opposite one another and respectively connected to each end of an upper rim defining the upper portion of the submersible body, the two side walls extending in a flared and symmetrical manner with respect to a median longitudinal plane of the branch.

The flared nature of the branches forms a spanning that participates in the nesting of two breeding cases by superposition of one on the other.

According to a fourth feature of the first aspect of the invention, the protective wall having a netting, the mesh of which has increasing dimensions from the bottom of the housing to the upper edge. This feature makes it possible to better protect the bivalves in the spat state found in the bottom of each housing.

According to a fifth feature of the first aspect of the invention, the breeding case comprises at least two arms that extend outside the submersible body on the radial axis B-B and/or on the radial axis C-C, each arm being connected to the framework. The two arms help to keep two breeding cases assembled by superposition along the same axis.

According to a sixth feature of the first aspect of the invention, the submersible body comprises means for constraining the growth of at least one bivalve so as to cause it to grow in a determined shape.

A second aspect of the invention relates to a suspended bivalve breeding column comprising a determined number of breeding cases defined according to the first aspect of the invention.

The bivalve breeding column is characterized in that each breeding case is respectively nested by superposition below and/or above along the suspension axis A-A, two nested breeding cases are configured, on the one hand, to be movable with respect to one another between a compact state in which the breeding cases rest on one another and an extended state in which the breeding cases are kept at a distance from one another while locked, and on the other hand, to allow tilting about a radial axis B-B, C-C of the upper breeding case relative to the lower breeding case.

Advantageously, the mobility of the nested breeding cases along the suspension axis A-A allows the submerged breeding column to pass from its deployed state to its compact state. This possibility is particularly useful when a problem of bottom water anoxia is detected. Anoxia is a phenomenon observed in some saltwater lagoons. Anoxia corresponds to a decrease in the oxygen saturation in the lagoon water. This phenomenon is due to particular climatic conditions: exceptional heat, absence of wind, etc. This drop in oxygen saturation has been observed to spread from the bottom or base of the water column to the surface. So-called bottom water anoxia takes its name from its mode of propagation. However, the subsurface part of the water column, that is, about two meters below the surface, is generally spared from anoxia. Bottom water anoxia increases the mortality rate of bivalves that are disposed at the base of the water column near the bottom. The latter die of asphyxiation. In fact, the breeding column in the compact state extends only in the subsurface; the bivalves are then kept in an area of the water column where the oxygen saturation is sufficient to allow their survival.

A third aspect of the invention consists of a suspended bivalve breeding method comprising at least one bivalve breeding column according to the second aspect of the invention.

According to the invention, the breeding method comprises:
 a step of submerging at least one breeding column in a compact state, each housing of each breeding case comprising at least one bivalve; and
 a bivalve breeding step, during which a breeding column is kept submerged in a deployed state.

BRIEF DESCRIPTION OF THE SEVERAL VIEWS OF THE DRAWINGS

Other features and advantages will appear in the following detailed description of a non-limiting embodiment of the invention, which is illustrated by the enclosed FIG. 1 to 10.

DETAILED DESCRIPTION OF THE INVENTION

Figure 1:
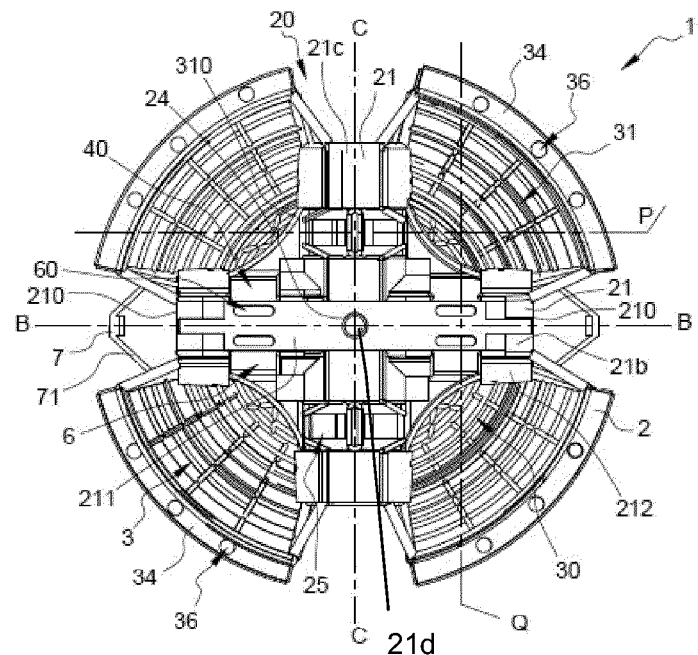
FIG. 1 is a top view of a bivalve breeding case according to one embodiment of the invention.

The present invention relates to a breeding case 1 suitable for breeding bivalves such as oysters, clams, scallops, mussels, etc. The breeding case 1 can be likened to a support for breeding bivalves.

The breeding case 1 is configured so as to allow a shellfish cultivation suspended under a table or under ropes connected to floating supports that are used for breeding lines at sea. This technique consists in suspending a rope to which bivalves are attached in a determined number of stages that are spaced apart by predetermined distance so as to occupy the entire water column.

For this purpose, the breeding case 1 comprises a submersible body 2 so as to allow the breeding case 1 to be submerged in water. Preferably, in an eco-responsible approach, the submersible body 2 is designed so as to be biologically neutral in an aquatic environment. In addition, still in this approach, the submersible body 2 can be made of a polymeric and/or composite material that is biobased and/or recycled.

As illustrated in FIG. 1 to 10, the breeding case 1 comprises at least one housing 3 provided in the submersible body 2. A housing 3 is suitable for receiving and protecting at least one bivalve. Preferably, a housing 3 is suitable for receiving and protecting a single bivalve.

In this example, the submersible body 2 comprises a framework 20. Preferably, the framework 20 is perforated in order to facilitate the immersion and the emersion of the submersible body 2 of the breeding case 1.

The framework 20 delimits a determined number of housings 3. For these purposes, the framework 20 is formed by two branches 21 that respectively extend along two radial axes B-B and C-C perpendicular to one another. The two branches 21 extend between two lateral ends 210. The two branches 21 intersect at one point. Thus, the framework 20 has a cross-section in the shape of a cross, which is visible in FIGS. 1, 3, 5, 6 and 9. This specific configuration of the framework 20 stiffens the submersible body 2.

As illustrated in FIG. 1 to 10, each branch 21 comprises an upper rim 211 that extends between each lateral end 210 of the branch 21. The upper rim 211 defines the upper portion 22 of the submersible body 2. The branch 21 comprises a side wall 212 extending from the upper rim 211 and toward a lower rim 213. The lower rim 213 of the side wall 212 defines the lower portion 23 of the submersible body 2. Preferably, each side wall 212 is perforated.

Furthermore, the submersible body 2 is suitable for being suspended from a support such as a breeding table. To this end, the framework 20 comprises at least one through orifice 24 that is disposed at the point of intersection of the two branches 21. The axis along which the orifice 24 is positioned corresponds to a suspension axis A-A of the breeding case 1. The suspension axis A is perpendicular to the plane formed by the two radial axes B-B, C-C (first axis B-B, second axis C-C) of the branches 21 (first branch 21*b*, second branch 21*c*). In addition, the orifice 24 is configured so that a rope can be threaded through the framework 20 of the permeable body 2.

In addition, the branches 21 delimit a determined number of housings 3. In particular, the branches 21 compartmentalize the submersible body 2 into four separate housings 3 that are spaced apart from one another. In this example, the submersible body 2 comprises four bivalve housings respectively disposed radially with respect to the suspension axis A-A and between two adjacent branches 21 of the framework 20.

In this example, the framework 20 spaces each housing 3 by a determined distance. Spacing each bivalve also helps reduce the spread of germs, viruses and/or bacteria, such as the bacterium *Vibrio splendidus*.

From this perspective, each branch 21 has a cross-section comprising two side walls 212 (first branch 21*b* comprising first branch side walls 212*b*) opposite one another and connected respectively to each side of the same upper rim 211. More specifically, the two side walls 212 extend in a flared and symmetrical manner with respect to a median longitudinal plane of the branch 21. Preferably, the two side walls 212 have a greater spacing at the lower rim 213 with respect to the spacing at the upper end at the upper rim 211. Thus, each branch 21 comprises a flared hollow structure that is open below and that defines a straddle space 214 that helps to allow nesting by superposition with a branch 21 of another breeding case 1. The straddle space 214 is open in the lower portion 23 of the framework 20 and delimited, on the one hand, laterally by the inner face of each side wall 212 of a branch 21, and on the other hand, above by the upper rim 211.

For information, an upper rim 211 extends lengthwise between two lateral ends 210 over a distance of between 150 mm and 200 mm. At the same time, and still for information, an upper rim 211 extends widthwise between each of its sides over a distance of between 15 mm and 25 mm. Furthermore, the center distance between the two lower rims 213 of each side wall 212 of the same branch 21 is between 30 mm and 40 mm.

Figure 2:
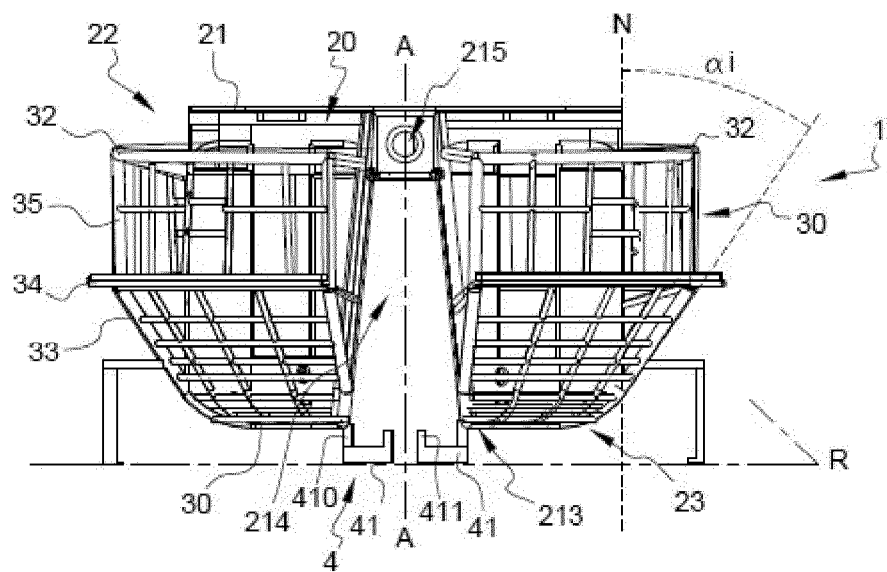
FIG. 2 is an illustration of a side view of the breeding case of FIG. 1, each housing of the breeding case containing a bivalve.

As illustrated in FIGS. 1 and 2, each housing 3 is equipped with a bottom 30 defining the lower portion 23 of the submersible body 2. The bottom 30 extends from the lower rim 213 of the adjacent side walls 212 belonging to two different branches 21. Furthermore, the housing 3 has a protective wall 31 that extends longitudinally from the bottom 30 of the housing 3 to an upper edge 32. The upper edge 32 is disposed at the upper portion 22 of the submersible body 2.

The protective wall 31 comprises a front portion and two side portions that are secured to each branch 21 and that contributes to delimiting the housing 3 laterally.

In this example, the protective wall 31 comprises a lower edge 33 that extends longitudinally from the bottom 30 of the housing to a collar 34. Preferably, the lower edge 33 is inclined with respect to a normal N that is parallel to the suspension axis A-A. In this example, the angle of inclination $\alpha i$ of the lower edge 33 with respect to the normal N is between 15° and 30°, and preferably the angle of inclination $\alpha i$ with respect to the normal N is 20°.

When installing a bivalve in the spat state inside a housing 3, the hinge of the bivalve or its dorsal part is positioned against the bottom 30 of the housing. Thus, the bivalve filtration membrane is oriented, by the inclination of the lower edge 33, toward the outside of the housing 3. This feature ensures better filtration and orients the growth of the bivalve according to the orientation of the protective wall 31.

The collar 34 is fitted to the protective wall 31 and extends transversely between each of its side edges. The protective wall 31 also comprises an upper collar portion 35 that extends longitudinally from the collar 34 to the upper edge 32.

The protective wall 31 provides lateral protection for the housing 3. Indeed, it extends laterally from two adjacent lateral ends 210 of two different branches 21. This lateral protection makes it possible to prevent access to the housing 3 laterally by predators such as sea bream. Furthermore, the housing 3 can also comprise a rear wall 310 that extends between two branches 21 adjacent to the interior of the submersible body 2. Preferably, the housing 3 is delimited, on the one hand, laterally by the protective wall 31 and the rear wall 310, and on the other hand, below by the bottom 30.

Furthermore, the protective wall 31 generates a housing 3, the depth of which can vary between 70 mm and 100 mm. The depth of the housing 3 is defined by the distance between the bottom 30 of the housing 3 and the upper edge 32 of the protective wall 31. A housing 3 of this depth can accommodate both bivalves at the spat stage and bivalves of adult sizes.

Advantageously, the bottom 30 of the housing 3 and the protective wall 31 are formed by a perforated structure, of the netting type. The netting of the bottom 30 of the housing 3 and of the protective wall 31 has a mesh of determined dimensions.

Advantageously, in this example, the netting 31a comprises a mesh 31b of increasing dimensions from the bottom 30 of the housing 3 to the upper edge 32. For information, the mesh 31b of the netting 31a at the bottom 30 of the housing may comprise dimensions of between 2.5 mm×2.5 mm and 6 mm×6 mm. Conversely, the mesh of the netting 31a in the upper collar portion 35 may comprise dimensions of between 12 mm×12 mm and 25 mm×25 mm. It should be noted that the mesh 31b of the netting 31a can be of any shape, such as polygonal, parallelepipedal, circular, etc.

Advantageously, the netting of the bottom 30 can comprise a tighter mesh. Each housing can then accommodate small gravel or sand to promote the breeding of burrowing bivalves such as clams, cockles, tellins, scallops, etc.

Preferably, the rear wall 310 may comprise a netting that has the same properties as that of the protective wall 31.

The characteristics of the housing 3, and in particular the netting, contribute on the one hand to facilitating the immersion and the emersion of the submersible body 2 of the breeding case 1, and on the other hand to ensuring the circulation of water and phytoplankton, which guarantees good oxygenation of the housing 3 and a good supply of food to the bivalve contained in the housing 3. The netting allows the shellfish farmer to protect his bivalve production without using a protective net.

Furthermore, the inclined nature of the lower portion 33 of the protective wall 31 allows the volume of the housing 3 below the collar 34 to be reduced, which helps optimize the nesting by superposition of two breeding cases 1.

Advantageously, superimposing several breeding cases 1 makes it possible to envisage shellfish cultivation suspended under a table. The objective is to use all the available water depth in order to optimize the bivalve production volumes. Indeed, some bivalve growing sites can comprise several meters of water height. For information, in France, the Thau lagoon site can have a water height of between 3 m and 9 m. In order to optimize cultivation on such a water column, the breeding case 1 is configured to be nested by superimposition below and above with other breeding cases 1.

Preferably, the breeding case 1 is configured so that each bottom 30 of a housing 3 is separated from the bottom 30 of the housing 3 of an upper and/or lower breeding case 1 by a distance of between 40 mm and 120 mm. This makes it possible to obtain 8 to 15 breeding cases 1 per meter.

As illustrated in FIG. 1 to 10, the breeding case 1 comprises locking means 4 sliding in translation. The locking means 4 allow two breeding cases 1 to be nested by superposition below or above. The locking means 4 also ensure reversible cohesion between the two nested breeding cases 1.

In particular, the locking means 4 comprise at least one female member 40 and at least one male member 41. The male member 41 is complementary to the female member 40. The locking means 4 of a first breeding case 1 are configured to cooperate with the locking means 4 of another breeding case 1 superimposed below and/or above relative to the first breeding case 1 (shown in FIG. 4 to 8).

Figure 3:
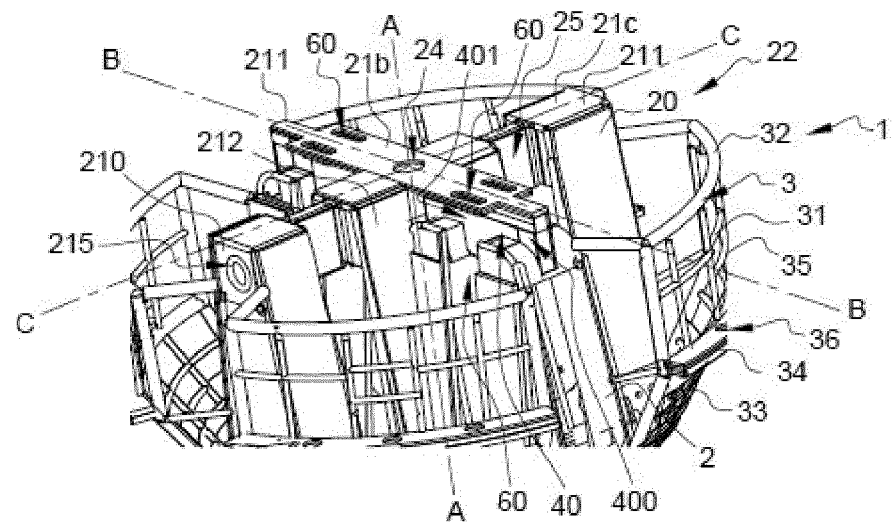
FIG. 3 is a perspective view of the nesting members of the breeding case of FIG. 1.

As particularly illustrated in FIGS. 2 and 3, in particular, the locking means 4 have at least one female member 40 disposed in the upper portion 22 of the submersible body 2. In this example, the female member 40 comprises at least one opening 400 located in a plane passing through the radial axis B-B. The opening 400 is disposed at a first lateral end 210 of a branch 21. The opening 400 of the female member 40 communicates with a groove 401 that extends under the upper rim 211 along an axis parallel to the radial axis B-B. It should be specified that the male member 41 is configured to slide in the groove 401 in order to lock in the female member 40.

In order to cooperate with a female member 40 of another superimposed breeding case 1, the male member 41 is disposed in the lower portion 23 of the submersible body 2.

According to an embodiment of the invention that is not described, the respective positions of the male member 41 and the female member 40 can be reversed. According to this arrangement, the female member 40 is disposed in the lower portion 23 of the submersible body 2. Conversely, the male member 41 is then disposed in the upper portion 22 of the submersible body 2.

Preferably, the male member 41 comprises an offset segment 410 with respect to the submersible body 2. The offset segment 410 makes it possible to offset a stop 411 located at the free end of the offset segment 410. In this example, the stop 411 is formed by a hook.

In the example illustrated in FIG. 1 to 10, the breeding case 1 comprises four female members 40 and four male members 41. Here, the female members 40 and the male members 41 are distributed in pairs on each branch 21 symmetrically with respect to the radial axes B-B and C-C.

In this sense, according to the illustrated example, it is possible to distinguish two types of branches 21, a female branch (or first branch) 21b that extends along the radial axis B-B and a male branch (or second branch) 21c that extends along the radial axis C-C. This distinction between the female (or first) branches 21b and the male (or second) branches 21c is made by the type of members 40, 41 that they comprise.

According to this example, a male branch 21c only comprises male members 41 that are distributed two by two in pairs on either side of the point of intersection between the branches 21, 21b, 21c. In the example illustrated in FIGS. 1 and 2, a male member 41 is disposed in the straddle space 214. More precisely, a male member 41 is disposed in the straddle space 214 at the lower rim 213 of a side wall 212.

As illustrated in FIG. 1, a pair of male members 41 is disposed in a plane P that is parallel to the female branch 21b.

A male branch 21c comprises two pairs of male members 41 that are disposed at a determined distance from the point of intersection of the two branches 21, 21b, 21c. Preferably, the two pairs of male members 41 are disposed at an equal distance from the point of intersection of the two branches 21, 21b, 21c.

According to the example illustrated in FIG. 1 to 10, a female branch 21b comprises only female members 40 that are distributed two by two in pairs on either side of the point of intersection between the branches 21, 21b, 21c. In the example illustrated in FIGS. 1 and 2, a female member 41 extends over the side wall 212 of the female branch 21b.

A female branch 21b comprises two pairs of female members 40 that extend in pairs symmetrically with respect to the male branch 21c. Each pair of female members 40 extends on either side of the male branch 21c. The two female members 40 that make up a pair extend parallel to the female branch 21b.

The locking means 4 have a specific configuration that makes it possible to nest two breeding cases 1 by superposition when the radial axis B-B of a first breeding case 1 is superimposed with the radial axis C-C of a second breeding case 1. This is due to the fact that the female members 40 and the male members 41 are distributed symmetrically over two separate branches 21, 21b, 21c. Thus, to assemble two breeding cases 1, it is advisable to rotate a first breeding case 1 by 90° along the suspension axis A-A relative to a second breeding case 1.

According to this assembly method, a column 5 of breeding cases 1 has an assembly of breeding cases 1 in which each breeding case 1 is offset by 90° with respect to the breeding case 1 with which it is nested above and/or below. Each breeding case 1 of a column is respectively nested, along the suspension axis A-A, below and/or above, with at least one other breeding case 1.

As illustrated in the example of FIGS. 1 and 3, the breeding case 1 comprises at least one movement groove 6 that is provided in the submersible body 2. In this example, the submersible body 2 comprises four movement grooves 6. Each movement groove 6 respectively communicates with the groove 401 of the female member 40 of the locking means 4.

Each movement groove 6 extends along an axis parallel to the suspension axis A-A. Thus, when the male member 41 is locked in the movement slide, it can slide in the movement slide 6 in a direction parallel to the suspension axis A-A.

Figure 4:
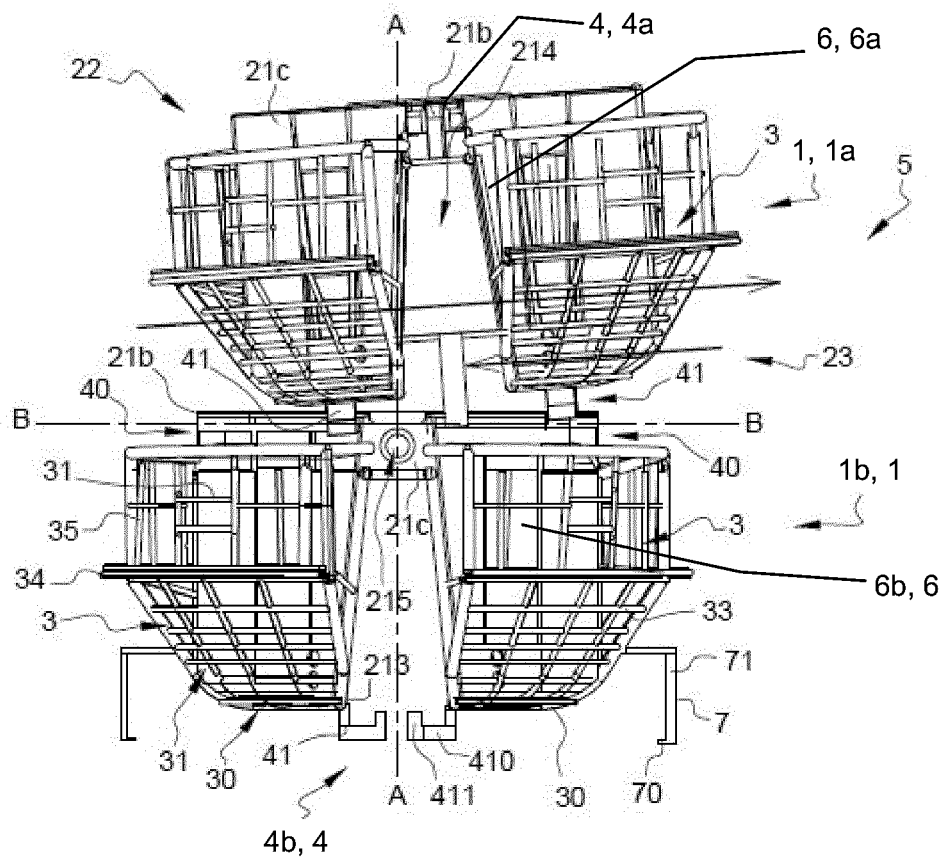
FIG. 4 is a side elevation view of the nesting action of two breeding cases one on the other.

As illustrated in FIG. 4, when two breeding cases 1 are locked in two stages according to a back and forth movement. In this sense, a first pair of male members 41 of the upper breeding case 1 is locked, by sliding in a translational movement in a first direction, in a first pair of female members 40 of the lower breeding case 1. The first pair of male members 41 of the upper breeding case 1 is brought into abutment with the male branch 21c of the lower breeding case 1 in order to allow the second pair of male members 41 of the upper breeding case 1 to be locked in the second pair of female members 40 of the lower breeding case 1. There is a second translational movement in a second direction opposite the first direction of translation. The second translational movement brings the two pairs of male members 41 of the upper breeding case 1 into the locked position.

Figure 5:
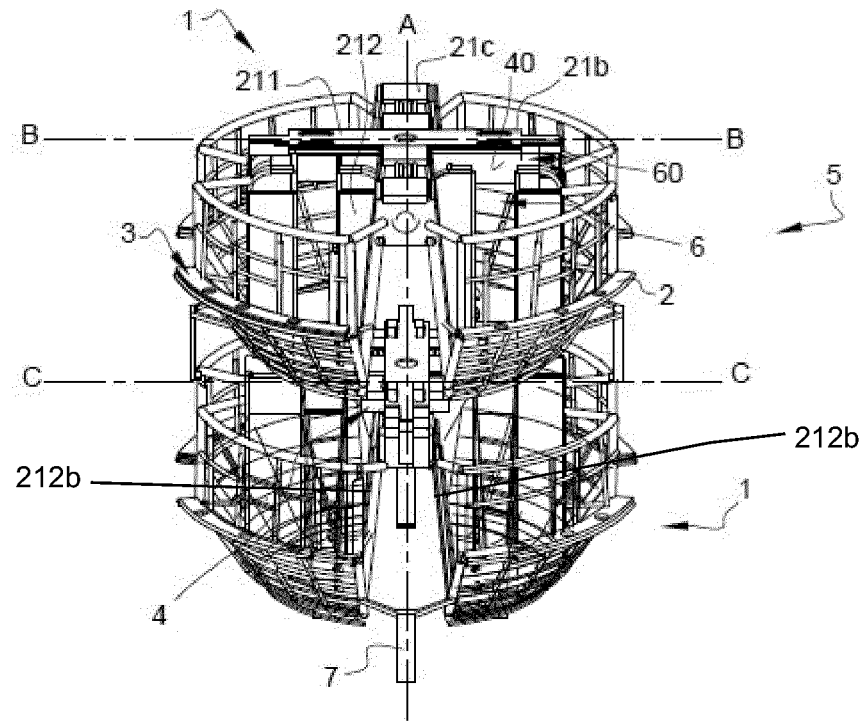
FIG. 5 is a perspective view of a set of two breeding cases conforming to the breeding case of FIG. 1, the two breeding cases being nested and in the suspended position.
Figure 6:
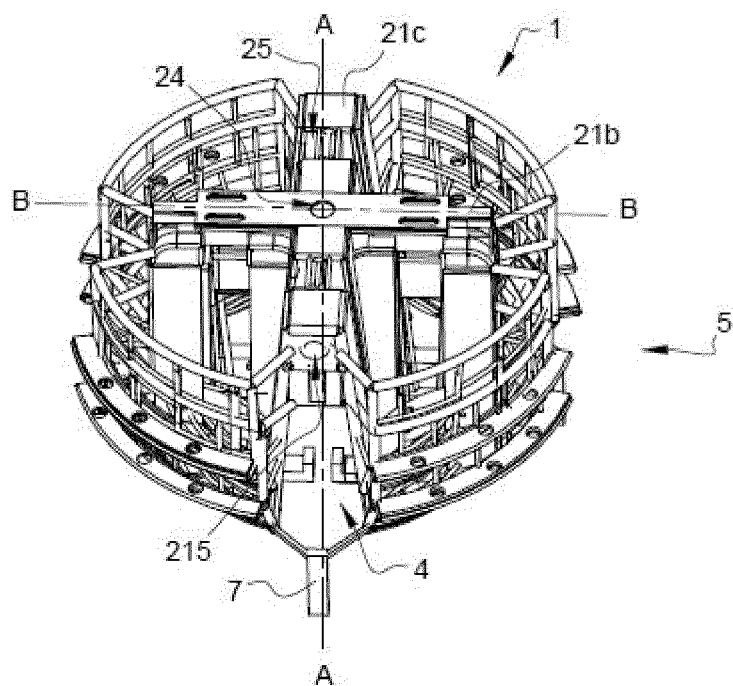
FIG. 6 is a perspective view of a set of two breeding cases conforming to the breeding case of FIG. 1, the two breeding cases being nested and in the retracted position.

The locked position is illustrated in FIGS. 5 and 6; in this position, each male member 41 of the upper breeding case 1 is locked in a movement groove 6. In the locked position, two breeding cases 1 are movable in translation with respect to one another along the suspension axis A-A through each movement groove 6. The locking means (4) is removably engaged with a respective locking means 4a of an above adjacent breeding case 1a in the above locked position. The above locked position is comprised of the above nested and locked position and the above tilted and locked position. The framework is movable along said suspension axis (A-A) relative to the above adjacent breeding case 1a according to the movement groove 6 between the above nested and locked position (the compact position) and the above tilted and locked position (the deployed and tiltable position). The relationships are modular, such that the locking means 4 is removably engaged with another respective locking means 4b of a below adjacent breeding case 1b. The locking means (4) is removably engaged with a respective locking means 4b of the below adjacent breeding case 1b in a below locked position. The below locked position is comprised of the below nested and locked position (the compact position between the framework and the below adjacent case) and the below tilted and locked position (the deployed and tiltable position between the framework and the below adjacent case). The movement grooves 6, 6a, 6b (above movement groove 6a, below movement groove 6b) control the transition between compact position and deployed position, while remaining locked to each other.

To obtain such a result, the movement rooves 6 are disposed in pairs in a plane Q that is parallel to the male branch 21c. Preferably, the movement grooves 6 and the male members 41 are disposed at an identical distance from the point of intersection of the two branches 21, 21b, 21c.

In the locked position, two breeding cases 1 are movable between two states, a compact state and a deployed state. In the compact state, each male member 41 of the upper breeding case is located at a lower end of a movement groove 6 of the lower breeding case. In the compact state, the upper breeding case 1 then rests on the lower breeding case 1 (illustrated in FIG. 6). Conversely, in the deployed state, each male member 41 of the upper breeding case 1 is in abutment with the upper rim 211 of a female branch 21b of the lower breeding case 1. In the deployed state, the two breeding cases 1 are kept at a distance from one another while remaining locked (illustrated in FIG. 5).

Of course, this mobility of two breeding cases 1 locked with respect to one another can be transposed to a column 5 of breeding cases 1, the column being able to go from a compact state to a deployed state under the effect an actuator. For information, the actuator can be a rope threaded into the orifice 24 of each breeding case 1 that makes up the column 5. Raising this rope makes it possible to transition the column 5 from a deployed state to a compact state; conversely, giving slack to the rope makes it possible to go from the compact state to the deployed state.

The compact state can be useful for transporting a column of breeding cases 1 from a land site where breeding cases 1 of the column 5 can be loaded with bivalves to a breeding table located in a body of water. In addition, the compact state makes it possible to protect bivalves in the spat state and/or to keep them in each housing when the bivalve breeding column 5 is launched. This also applies to bivalves of a higher caliber.

The deployed state can be used during suspended breeding of the bivalves, in fact, the spacing between the breeding cases 1 promotes the growth of the bivalves. In addition, the deployed state can also be used before cultivation when loading the column 5 with bivalves and when unloading the column 5 when the bivalves mature for consumption.

It should be noted that when the breeding cases 1 are assembled in the column 5, whether in the deployed state or in the compact state, a breeding case 1 in the column 5 contributes to restricting access to the housings 3 of the breeding case 1 that is nested below it. In this sense, the breeding case that is at the top of the column 5 may not be loaded with bivalves so as to avoid losses caused by predators.

As illustrated in FIGS. 1 and 3, in order to avoid any error during the assembly of a column 5 of breeding cases 1, the submersible body 2 comprises at least one mistake-proofing means 25. According to the illustrated example, the mistake-proofing means 25 is disposed on the male branch 21c in the plane P common to the two male members 41. Preferably, the submersible body 2 comprises four mistake-proofing means 25. Each mistake-proofing means 25 is formed by a slide that does not comprise a stop and therefore does not allow two breeding cases 1 to be locked by superposition.

Figure 8:
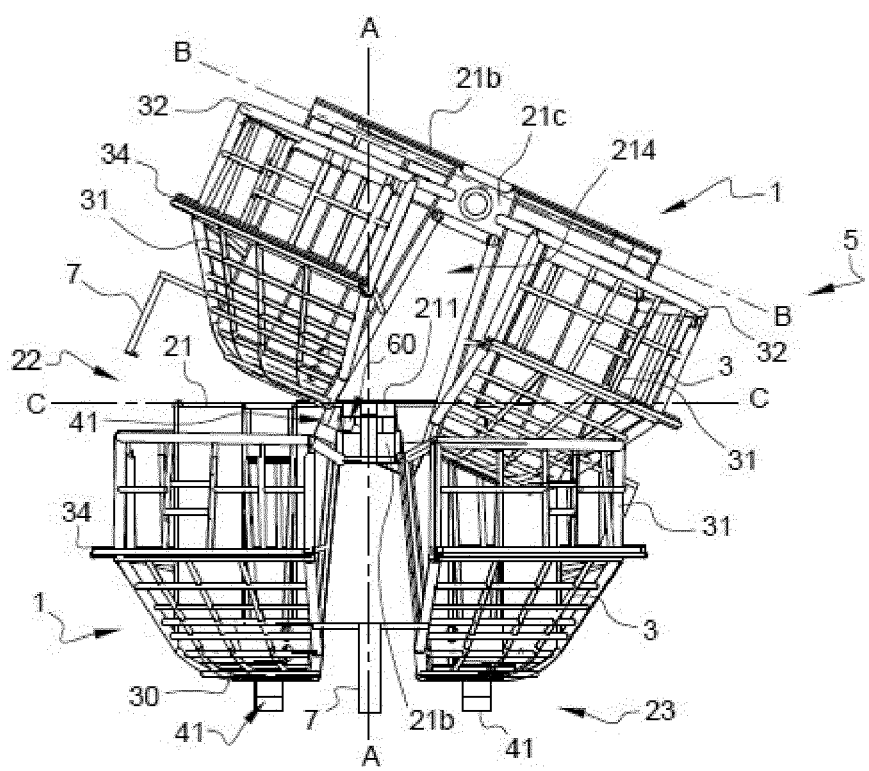
FIG. 8 is a side elevation view of the breeding case assembly of FIG. 7 in a tilted position of the upper breeding case.

As illustrated in FIG. 8, when two breeding cases 1 are nested one on the other, the structure of the framework 20 of the submersible body allows the upper breeding case 1 to be tilted relative to the lower breeding case 1. Here, this tilting takes place about the radial axis B-B.

The tilting is obtained by lifting part of the upper breeding case 1 located on one side of its male branch 21c. Two male members 41 of two different pairs are brought into abutment with the upper rim 211 of the female branch 21b of the lower case 1, while the two other male members 41 of the upper breeding case tilt within the movement groove 6.

In order to improve this tilting phenomenon, the movement groove 6 comprises a toggle stop 60 disposed at the upper rim 211. The toggle stop 60 is disposed in the extension of the movement groove 6. The toggle stop 60 is disposed on the same axis as the movement groove 6. In this example, the toggle stop 60 is formed by a slot made in the upper rim 211. The slot extends longitudinally along the radial axis B-B.

Advantageously, the hook of the male member 41 engages between the slot of the toggle stop 60 and the edge surface of the upper rim 211, generating a rocking movement of the upper breeding case. The toggle stop 60 allows tilting while preventing disengagement of the upper breeding case 1.

The tilting makes it possible to load a column 5 assembled with a determined number of breeding cases 1 with bivalves before launching. Conversely, tilting allows the mature bivalves to be unloaded after cultivation in an aquaculture environment. The operations of loading and unloading the breeding cases 1 from a column are facilitated by this tilting phenomenon. Moreover, since two successive breeding cases 1 are nested according to a radial offset of 90°, two successive breeding cases of the same column are also tilted with a radial offset of 90°.

As illustrated in FIGS. 1, 2 and 4 to 8, the submersible body 2 comprises at least two arms 7 that extend outside the submersible body 2 on the radial axis B-B or on the radial axis C-C, each arm 7 being connected to the framework 20. In this example, each arm is connected to the framework 20 through the protective walls 31 of the housings 3 located on either side of the radial axis B-B and/or of the radial axis C-C. Each arm 7 is disposed in the same plane R as the male members 41. The plane R extends under the submersible body 2 of the breeding case 1. The plane R is parallel to the plane formed by the radial axes B-B and C-C.

Figure 7:
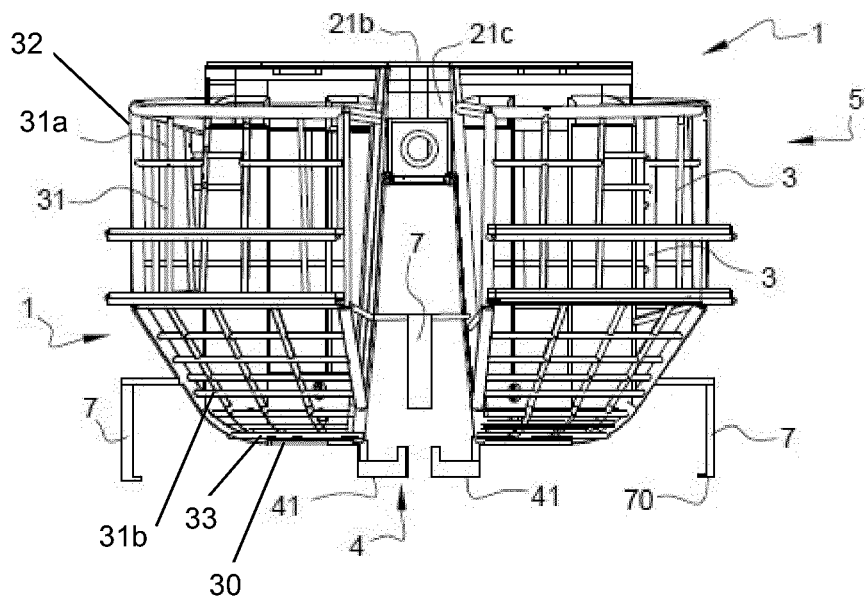
FIG. 7 is a side elevation view of FIG. 6.

The submersible body 2 can also comprise four arms 7 located on the two radial axes B-B and C-C (illustrated in FIG. 7).

In this example, an arm 7 comprises a free end 70 fitted with a hook and at least one offset segment 71 of the structure of the submersible body 2. The hook is oriented in the direction of the suspension axis A-A. The hook has the same orientation as the male members 41 that are located on the same side of the radial axis C-C.

The arms 7 help maintain the cohesion of a column 5 comprising a determined number of breeding cases 1. In fact, the arms 7 extend outside the structure and make it possible to keep the lower breeding case 1 in the axis of the upper breeding case 1. This can be useful in an aquaculture site that is subject to periodic swells.

In addition, the arms 7 also contribute to preventing the unlocking of two successive breeding cases in a tilting situation (illustrated in FIG. 8). This situation can arise when the bivalves are loaded into each housing 3 of a column 5 of breeding cases 1. In this situation out of the water, the column 5 is suspended in order to fill it with bivalves; the arms 7 contribute to keeping the column 5 upright due to their position in the plane R and to their orientation.

Figure 9:
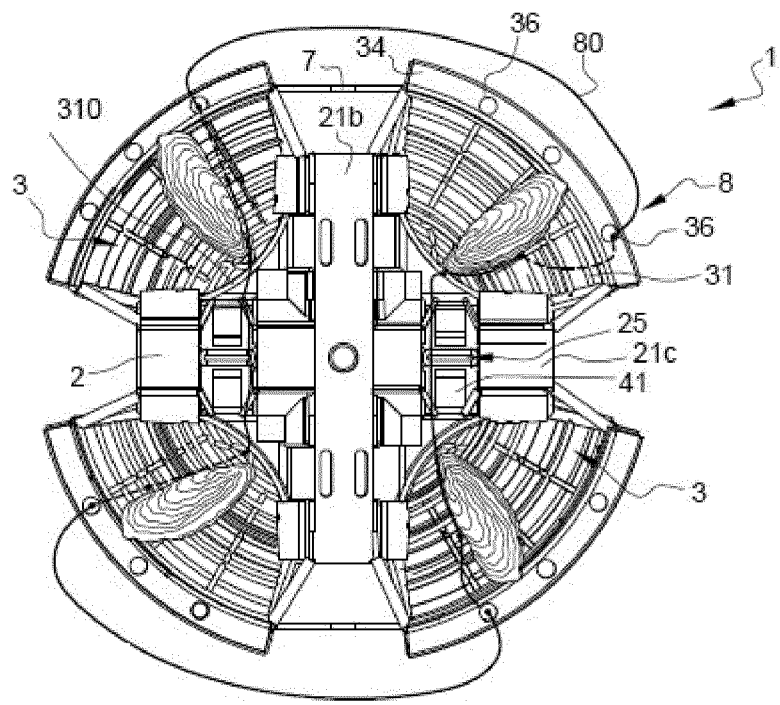
FIG. 9 is a top plan view of a breeding case according to FIG. 1, the breeding case being equipped with means for constraining the growth of a bivalve.

As illustrated in FIG. 9, the breeding case 1 can comprise means 8 for constraining the growth of at least one bivalve. The constraining means 8 allow the bivalve to grow in a determined shape.

In this example, the constraining means 8 can be formed by a constraining rope 80 that is disposed so as to impede the growth of the bivalve along an axis. Thus, a constraint applied to the front part of the bivalve can cause the bivalve 3 to form a heart-shaped shell. In this example, the positioning of the constraining rope 80 is chosen through holes 36 that are provided on the collar 34 of the protective wall 31. Due to the perforated nature of the submersible body 2, a constraining rope 80 can run from one housing 3 to another to constrain the bivalves respectively contained in each housing 3.

It should be noted that the constraining means 8 can also be formed by a claw or a rod.

Figure 10:
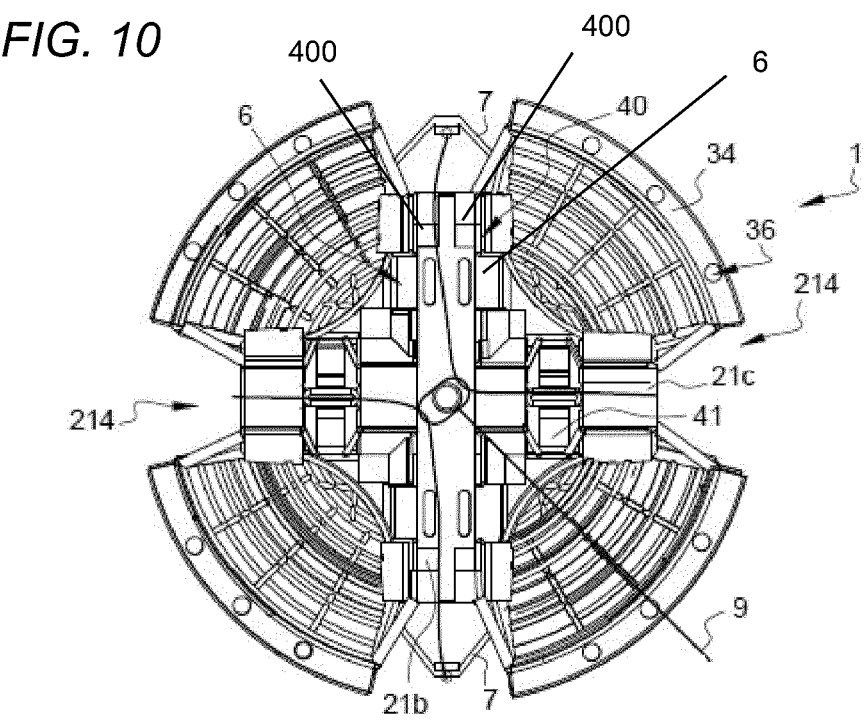
FIG. 10 is a top plan view of a breeding case according to FIG. 1, the breeding case being equipped with a suspension rope.

As illustrated in FIG. 10, in order to be suspended from a breeding table, a column 5 of breeding cases 1 requires a means of attachment to this table. As illustrated in FIG. 10, the upper breeding case 1 of a column 5 can be connected to a table through a suspension rope 9 that has four points of attachment to the upper breeding case 1. Here, the suspension rope 9 is divided into four so as to be threaded under each branch 21. The four-point attachment makes it possible to keep the column 5 suspended in a balanced manner.

In order to secure the attachment, the column 5 of breeding cases 1 is thus suspended at four attachment points. The attachment points may correspond to suspension orifices 215 that are formed at the lateral ends 210 of at least one branch 21, 21b, 21c. Each suspension orifice 215 extends along the radial axis of the branch 21 in which it is formed (illustrated in FIGS. 2, 3 and 5).

Moreover, as illustrated in FIG. 10, the suspension rope 9 can also pass through two opposite arms 7, still with the objective of stabilizing the suspended structure.

The invention also relates to a method for breeding suspended bivalves comprising at least one bivalve breeding column 5 comprising a determined number of breeding cases 1.

The breeding method comprises a step of loading the housings 3 of each breeding case 1 of a column 5. Advantageously, it is possible to use the tilting movement about the radial axis B-B of a breeding case 1 in order to facilitate access to the housing 3 to place the bivalve. Preferably, only one bivalve is inserted per housing 3. In general, the bivalves are inserted in the spat state whether they are large sizes (T20) or small sizes (T6, T8).

To optimize column cultivation with for example a depth of between 5 meters and 6 meters on the breeding site, columns of fifty breeding cases 1 are assembled. Advantageously, in its compact state, a column 1 of fifty breeding cases has a height of less than 1.5 meters. This low height allows the column 5 to be transported easily in a compact state from a loading site to a breeding table.

Before launching, a column 5 is placed in its compact state with a view to conveying each column 5 to the breeding site. The passage from the deployed state to the compact state is managed through the rope, which extends along the suspension axis A-A of each breeding case 1.

The breeding method comprises a step of submerging at least one breeding column 5 in a compact state. At the time of submersion, each housing 3 of each breeding case 1 comprises at least one bivalve. However, it is possible not to load the housings 3 of the breeding case 1 at the top of the column 5.

The method may comprise a preculture step during which the breeding column 5 is kept submerged in its compact state for a determined period of time. This duration depends mainly on the size of the spat that have been loaded into the housings 3. This step makes it possible to conserve and protect the spat so that they absorb water and are kept at the bottom 30 of their housing 3. Indeed, when they are loaded into each housing 3, the spat are not sufficiently loaded with water to remain at the bottom 30 of each housing 3 during submersion. The duration of the preculture stage can vary from one minute or less for large caliber spat (T20) to 7 to 30 days for small caliber spat (T6, T8). If the submersion is done in the presence of a large swell, the duration of the preculture step is preferably extended until the swell subsides.

The breeding method comprises a step of deploying the column 5 of breeding cases 1. This step consists in releasing the upper end of the rope, which extends along the suspension axis A-A, the breeding cases 1 then passing, under the effect of gravity, from a compact state to a deployed state.

In a Mediterranean-type and/or temperate aquaculture zone, the step of deploying the column 5 is preferably carried out during the bivalve growth period. That is to say, it occurs in the spring and/or in the fall. The growth period is mainly due to the presence of plankton in the aquaculture breeding environment.

The breeding method comprises a bivalve breeding step, during which a breeding column 5 is kept submerged in a deployed state. The deployed state ensures optimal growth of the bivalves 2. In this example, the breeding stage can be between 6 to 18 months, and preferably the development stage can be between 10 to 14 months.

The breeding method can comprise one or more period(s) of exposure to simulate ocean marshes. The exposure technique is well known to shellfish farmers; it makes it possible to strengthen the bivalves by generating periods of stress that are followed by strong growth spurts.

The breeding method comprises an emersion operation for the set of breeding cases 1 when the bivalves 2 have reached their adult size. The emersion is carried out by raising the suspension rope 9.

The method also comprises an operation of extracting the bivalves. This step consists in separating the bivalves from each breeding case 1. This can be done directly during emersion. Usually, emersion is carried out using a lifting mat. Advantageously, the tilting movement of each breeding case 1 of a column 5 allows extraction of adult-sized bivalves during emersion.

Furthermore, the method can also comprise treatment stages of the bivalves according to the marketing criteria in force. By way of example, the bivalves can be subjected to a purification and storage bath before being marketed.

We claim:

1. A breeding case for bivalves, comprising:
   a submersible body having an upper portion 22 and a lower portion 23 opposite said upper portion:
   an orifice extending through the body and having a suspension axis A-A;
   a housing being provided in said submersible body and being configured so as to receive and protect a bivalve,
   wherein said submersible body comprises:
      a framework comprising: an upper rim, a lower rim 213, and a side wall 212 between said upper rim and said lower rim,
   wherein said upper rim is configured to define said upper portion,
   wherein said lower rim is configured to define said lower portion,
   wherein said framework further comprises: a first branch 21, 21b having a first axis (B-B); and a second branch 21, 21c having a second axis (C-C), said first axis being perpendicular to said second axis,
   wherein said first branch 21, 21b intersects said second branch 21, 21c at a point 21d, said first axis (B-B) and said second axis (C-C) forming a plane, said orifice being placed at said point, said suspension axis being perpendicular to said plane, wherein said first branch and said second branch define said housing, wherein said housing comprises: a bottom; and a protective wall extending from said bottom, said protective wall having an upper edge disposed at said upper portion and a lower edge 33 opposite said upper edge, and wherein said bottom 30 is configured to define said lower portion 23 with said lower rim 213;

a movement groove; and locking means in sliding translation with said movement groove, said locking means being configured to removably engage a respective locking means 4a of an above adjacent breeding case 1a in an above locked position, said above locked position being comprised of an above nested and locked position and an above tilted and locked position, said movement groove 6 being configured to be in removable sliding engagement with said respective locking means 4a, said framework being movable along said suspension axis relative to said above adjacent breeding case 1a according to said movement groove between said above nested and locked position and said above tilted and locked position, wherein said locking means is configured to removably engage a respective locking means 4b of a below adjacent breeding case 1b in a below locked position, said below locked position being comprised of a below nested and locked position and a below tilted and locked position, said locking means being configured to be in removable sliding engagement with a respective movement groove 6b of said below adjacent breeding case, said framework being movable along a corresponding suspension axis of said below adjacent breeding case 1b, according to said locking means in said respective movement groove between said below nested and locked position and said below tilted and locked position.

2. The breeding case, according to claim 1, wherein the locking means comprises:

a female member being disposed in said upper portion and comprising an opening through said first branch; and a locking groove in communication with said opening, said locking groove being parallel to said first axis; and a male member being disposed in said lower portion and comprising an offset segment having a free end 412; and a stop disposed at said free end of said offset segment, wherein said male member is configured to complement a respective female member of an adjacent breeding case, and wherein said female member is configured to complement a respective male member of another adjacent breeding case.

3. The breeding case, according to claim 1, wherein the locking means comprises:

a female member being disposed in said lower portion and comprising an opening through said first branch; and a locking groove 401 in communication with said opening, said locking groove being parallel to said first axis, and a male member being disposed in said upper portion and comprising an offset segment having a free end 412; and a stop disposed at said free end of said offset segment, wherein said male member is configured to complement a respective female member of an adjacent breeding case, and wherein said female member is configured to complement a respective male member of another adjacent breeding case.

4. The breeding case, according to claim 1, wherein said movement groove comprises a toggle stop disposed at said upper rim.

5. The breeding case, according to claim 1, further comprising: an additional three housings, wherein said first branch and said second branch define said housing and said three additional housings, said housing and said additional three housings being respectively disposed radially with respect to said suspension axis, each of said housinq and said three additional housings being between a respective portion of said first branch and a respective portion of said second branch.

6. The breeding case, according to claim 1, wherein said first branch has a cross-section and comprises two first branch side walls opposite one another and respectively connected to opposite sides of said upper rim of said first branch, the two first branch side walls extending flared and symmetrical with respect to said upper rim of said first branch.

7. The breeding case, according to claim 1, wherein said protective wall comprises a netting 31a, said netting beinq comprised of a mesh 31b having perforated dimensions increasing from said lower edge 33 to said upper edge.

8. The breeding case, according to claim 1, further comprising: at least two arms extending outside the submersible body along said first axis, each arm of said at least two arms being connected to said framework.

9. The breeding case, according to claim 1, wherein the submersible body further comprises means for constraining growth within said housing.

10. A column for suspended bivalve breeding, the column comprising:

the breeding case, according to claim 1; and an above adjacent breeding case 1a, wherein said locking means is removably engaged with a respective locking means 4a of said above adjacent breeding case 1a in said above locked position, wherein said above locked position is comprised of said above nested and locked position and said above tilted and locked position, wherein said movement groove 6 is in removable sliding engagement with said respective locking means 4a, and wherein said framework is movable along said suspension axis relative to said above adjacent breeding case 1a according to said movement groove between said above nested and locked position and said above tilted and locked position.

11. A method for suspended bivalve breeding, the method comprising the steps of:

placing a bivalve in the column of claim 10;

submerging the column with the locking means in the above nested and locked position; and breeding said bivalve with the column submerged in the above tilted and locked position.

12. A column for suspended bivalve breeding, the column comprising:

the breeding case, according to claim 1; and a below adjacent breeding case 1b, wherein said locking means is removably engaged with a respective locking means 4*b* of said below adjacent breeding case 1*b* in said below locked position, wherein said below locked position is comprised of said below nested and locked position and said below tilted and locked position, wherein said locking means 4 is in removable slidinq engagement with a respective movement groove 6*b* of said below adjacent breeding case, and wherein said framework is movable along said suspension axis relative to said below adjacent breeding case 1*b* according to said respective movement groove between said below nested and locked position and said below tilted and locked position.

* * * * *